April 21, 1959  L. CAMENZIND, JR  2,882,738
PNEUMATIC PULLEY
Filed July 18, 1955

INVENTOR
LOUIS CAMENZIND, JR.
BY
Gardner & Zimmerman
ATTORNEYS

United States Patent Office 2,882,738
Patented Apr. 21, 1959

2,882,738

PNEUMATIC PULLEY

Louis Camenzind, Jr., Hayward, Calif.

Application July 18, 1955, Serial No. 522,616

2 Claims. (Cl. 74—230.7)

This invention relates to the construction of pulleys, sheaves and the like, and is more particularly directed towards a pulley or sheave adapted to support a belt in which the frictional engagement between the pulley and belt may be readily controlled.

As is well known in the art, where a continuous belt is supported on one or more pulleys, there is frequently some expansion of the belt resulting in slippage of the belt on the drive pulley. This obviously reduces the efficiency of the operation and in many instances is detrimental to proper operation of a member which may be driven by the belt. To overcome the foregoing, there is frequently provided a take-up pulley which is adapted to reduce the slack in the belt, but there are many reasons why take-up pulleys are not suitable in many installations.

Accordingly, it is an object of the present invention to provide a pulley in which the effective circumferential extent may be selectively varied so as to respectively increase or decrease the belt tension.

Another object of this invention is to provide a pulley of the character described in which pneumatic means are incorporated for creating a greater or lesser pressure radially outwardly and against the belt supported on the pulley.

A further object of my invention is to provide apparatus of the character described in which the surface of the pulley coming into engagement with the belt is resilient and thereby affords a greater frictional gripping action therebetween.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
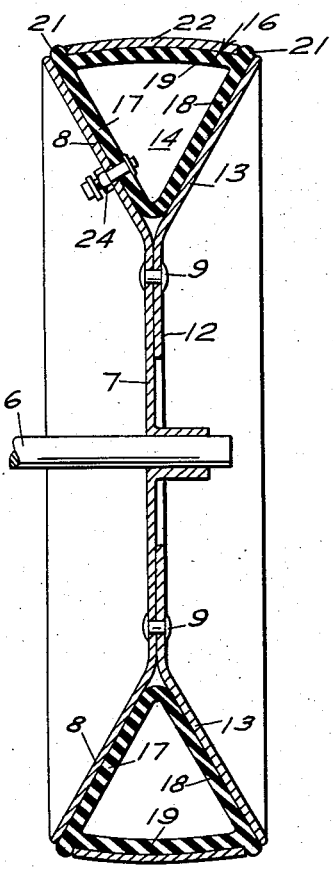
Figure 1 is a cross-sectional view of a pulley constructed in accordance with the teaching of the present invention.

In broad terms all of the pulley or sheave embodiments as illustrated in the drawing are adapted for supporting a belt, whether of continuous cross-sectional form or comprising a plurality of V-belts, in which the portion of the pulley in engagement with the belt includes a pneumatic member, whereby the pressure within the member may readily determine the gripping action of the pulley relative to the belt.

Referring first to Figure 1 of the drawing, it will be seen that the pulley includes a drive shaft 6 to which is secured in any suitable manner a disk-like wheel 7. As will be seen, the distal end portions of the wheel are flared outwardly as indicated at 8 so that the wheel provides a generally frusto-conical configuration. Secured to the wheel disk by rivets 9 or the like on the surface thereof opposed to the direction in which the bends 8 are provided is another disk-like member 12, such member having the end portions thereof bent outwardly as indicated at 13 whereby the portions 8 and 13 define a peripherally extending triangular trough or groove 14. Disposed within the trough 14 is a continuous pneumatic member 16, such member having side walls 17 and 18 disposed adjacent the disk portions 8 and 13 respectively and a tread portion 19 which forms the periphery of the pulley. Also, at the juncture of the side walls and the tread of the member 16 are peripherally extending beads 21 and it will be noted that the belt 22 is adapted to be seated on the tread 19 and is prevented from any lateral displacement by the beads 21.

The inner chamber of the pneumatic member 16 may be filled with air to any desired extent by a conventional valve 24 which passes through the bent portion 8 of the wheel disk and it will be appreciated that by increasing the pressure in the member the tread portion 19 will be deflected outwardly. This is primarily true because the metal disk portions 8 and 13 are substantially rigid and therefore any deformation of the member must be directed radially outwardly and thereby increase the effective circumference of the pulley. Obviously, if the tread portion 19 is forced radially outwardly, a greater pressure will be applied against the belt and any slack in the belt may be taken up by increasing the circumference of the pulley. Although the tread portion may have a slight bow in cross-sectional form as illustrated in the drawing, this will have no deleterious effect on the belt 22 as the flexibility thereof will permit it to conform to the bow of the member.

Figure 2:
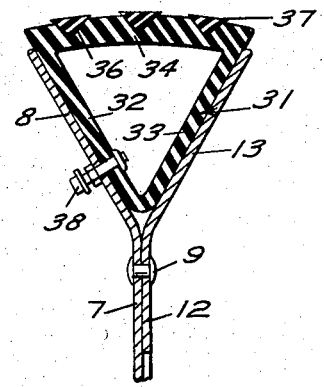
Figure 2 is a portional view similar to Figure 1 but illustrating a pneumatic pulley particularly adapted for driving V-belts.

In Figure 2 a slightly modified form of pulley arrangement is disclosed in which the wheel disk 7 and disk 12 are the same as that previously described and provided with offset portions 8 and 13 respectively. However, the pneumatic member 31, while being provided with the tapering side walls 32 and 33 respectively has the tread portion 34 thereof formed with a plurality of triangular peripherally extending grooves 36 which permit the use of the pulley for driving a plurality of V-belts 37. As will be understood, the belts 37 are seated within the grooves 36 and once again by forcing air into the peripherally extending cavity of member 31 through an air valve 38, the tread portion 34 of the member may be selectively forced outwardly and into tighter engagement with the V-belts.

Figure 3:
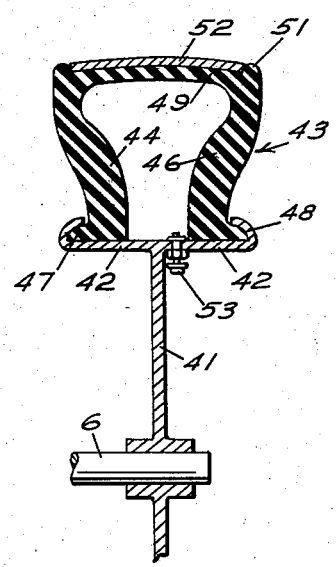
Figure 3 is a portional cross-sectional view similar to Figure 1 but showing a further modified form of the invention.

As was hereinabove explained, it is important that the increase in air pressure in the pneumatic member be directed primarily radially outwardly, as any lateral deformation of the pneumatic member will be substantially wasted. In other words, irrespective of the particular type of construction, the effective force of the pressure should be directed radially outwardly so as to increase the peripheral extent of the pulley. In Figure 3 the foregoing is accomplished without requiring the triangular shaped lateral restraining means 8 and 13 as described in connection with Figures 1 and 2. As shown in Figure 3, the drive shaft 6 is connected to a disk 41 whose distal ends are provided with flanges 42 extending equally from the general plane of the disk. A pneumatic member 43 is provided with side walls 44 and 46 extending downwardly to rest on the outermost surface of the flanges. Also, the beads 47 at the extreme ends of the side walls are retained in position by bending over the distal ends of the flanges as shown at 48 whereby relative movement between the flange and member is effectively prevented. Securing the ends of the side walls of the member together is a tread portion 49 of substantially thinner cross section than that of the side walls and such tread is provided with beads 51 whereby a belt 52 placed on the tread will be restrained against lateral displacement. An air valve 53 extends through the flange and is in communication with the cavity of the member and by having the tread substantially thinner than that of the side walls, upon introduction of pressure into the member, the tread will tend to become deformed in a radially outward direction and consequently, once again the belt will be urged into tighter engagement with the pulley, reducing slippage, and taking up slack which may appear in the belt.

Figure 4:
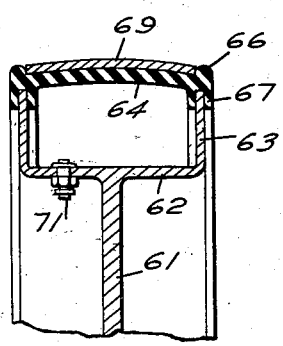
Figure 4 is another portional cross-sectional view, similar to Figure 1 and illustrating yet another modified form of the invention.

In Figure 4 a still further modified form of pulley arrangement is disclosed in which the wheel disk 61 which is again secured to a drive shaft is provided with opposed flanges 62 whose end portions are bent upwardly in generally parallel spaced relationship to the disk as shown at 63, thereby providing a generally U-shaped chamber. Instead of providing a continuous pneumatic member as described in connection with the other embodiments of the invention the portion 63 of the wheel disk corresponds to the side wall portions of the previously described pneumatic members and a tread 64 is provided in the nature of a diaphragm. This diaphragm is provided with the conventional beads 66 and in opposed relationship to the beads is a U-shaped portion 67 adapted to overlie the ends of the portion 63 and be sealed thereto. Once again the belt 69 overlies the diaphragm or tread 64 and the latter is caused to be expanded or contracted by introducing air through the valve 71 into the enclosed chamber defined by the disk portions 62 and 63 and diaphragm 64. Obviously, as the disk portion 63 is rigid, all of the air pressure will be effectively applied against the resilient diaphragm and will force the same outwardly for the purposes hereinabove mentioned.

From the foregoing description, it will be seen that while the pulley of the present invention is extremely simple in construction and operation, it fulfils a definite need in that it provides a means for selectively controlling the frictional engagement between a pulley and its belt so that slippage of the latter on the pulley may be completely eliminated. Likewise, notwithstanding the use of take-up pulleys or the like, by slightly increasing the pressure in the pneumatic member, any extra length on the belt may be taken up by merely increasing the pressure in the pulley and thereby increasing the effective circumference thereof and eliminating the belt slack.

What is claimed is:

1. A pulley construction including a wheel-like support arranged to be mounted on and driven by a shaft, means disposed adjacent the outer periphery of said support defining an outwardly directed continuous trough member, a continuous pneumatic member disposed within said trough member and normally extending radially beyond the same, valve means extending through said first and second members whereby the interior of said pneumatic member may be inflated, said pneumatic member including a tread portion positioned radially outwardly of said trough member adapted to support a belt, and including lateral projections extending radially outwardly of the central portion of said tread portion and adapted to restrain lateral movement of a belt.

2. Apparatus as set forth in claim 1 in which said trough member is provided with outwardly diverging walls and said pneumatic member is of generally trangular cross-sectional form with the lengths of the walls of said pneumatic member being substantially equal.

References Cited in the file of this patent

UNITED STATES PATENTS

| 1,560,524 | Avery | Nov. 10, 1925 |
| 1,792,733 | De Wein | Feb. 17, 1931 |
| 2,007,910 | Stephens | July 9, 1935 |
| 2,111,422 | Fawick | Mar. 15, 1938 |
| 2,119,395 | Locke | May 31, 1938 |

FOREIGN PATENTS

| 653,387 | France | Nov. 8, 1928 |